United States Patent [19]

Meyerle et al.

[11] 4,368,798
[45] Jan. 18, 1983

[54] AUTOMATIC CONTROL DEVICE OF AN INFINITELY VARIABLE TRANSMISSION GEAR DRIVEN BY AN INTERNAL COMBUSTION ENGINE, ESPECIALLY FOR MOTORIZED VEHICLES

[75] Inventors: Michael Meyerle, Meckenbeuren; Friedrich Ehrlinger, Friedrichshafen, both of Fed. Rep. of Germany

[73] Assignee: Zahnradfabrik Friedrichshafen AG, Friedrichshafen, Fed. Rep. of Germany

[21] Appl. No.: 181,082

[22] Filed: Aug. 22, 1980

[30] Foreign Application Priority Data

Aug. 24, 1979 [DE] Fed. Rep. of Germany ....... 2934269

[51] Int. Cl.³ .............................................. B60K 41/12
[52] U.S. Cl. ...................................... 180/307; 60/441; 60/444; 60/448; 60/449; 192/103 F; 192/87.14; 192/0.098

[58] Field of Search ................. 60/395, 441, 444, 448, 60/449; 180/307; 192/103 F, 87.14, 87.15, 87.16, 0.098

[56] References Cited

FOREIGN PATENT DOCUMENTS 2712327 10/1977 Fed. Rep. of Germany .

Primary Examiner—Gerald A. Michalsky
Attorney, Agent, or Firm—Karl F. Ross

[57] ABSTRACT

A hydrostatic transmission coupled with a gear transmission for operating a motor vehicle driven by an internal combustion engine has its accelerator pedal connected to the throttle valve of the engine and to the servovalve of the stepless hydrostatic transmission via an engine characteristic storage which modulates the accelerator travel signal applied to the servovalve to optimize the fuel consumption. The servovalve also receives input from an electric signal comparator which compares the engine speed with an output signal from the output unit of the hydrostatic transmission or the output shaft of the gear transmission.

9 Claims, 4 Drawing Figures

AUTOMATIC CONTROL DEVICE OF AN INFINITELY VARIABLE TRANSMISSION GEAR DRIVEN BY AN INTERNAL COMBUSTION ENGINE, ESPECIALLY FOR MOTORIZED VEHICLES

FIELD OF THE INVENTION

The invention relates to an automatic control system for an infinitely variable transmission driven by an internal combustion engine, especially for motor vehicles. More particularly the invention relates to an automatic control system for an infinitely variable transmission driven by an internal combustion engine for motor vehicles of the type in which an accelerator travel signal is generated by the accelerator pedal and is used to avoid a throttle valve opening and operate a servomechanism controlling the stepless transmission.

BACKGROUND OF THE INVENTION

An automatic control system is known, for example, from the German patent documents DE-OS No. 27 12 327 which describes a system whereby an accelerator pedal with subsequent accelerator pedal signal transmittor produces a signal that is used, via a first storage, to control the throttle-valve opening. In the first storage a function $F_1$ is so stored that the storage transmits an output signal which serves as a measure for the opening angle of the butterfly valve of the carburettor. In addition, the accelerator output signal is transmitted to a second storage that holds a function $F_2$. The second storage provides an output signal corresponding with the calculated speed of rotation of the internal combustion engine. This second storage in conjunction with a comparator circuit controls a servo-adjusting device for the direct operation of the infinitely variable transmission gear.

This circuit of an automatic control system of an infinitely variable transmission gear driven by an internal combustion engine is extremely cumbersome. It requires two storage facilities to ensure, on the one hand, the control of the throttle valve opening and, on the other, the control of the infinitely variable gear unit. Furthermore, it entails the risk of faults in the control if, as a result of incorrectly stored functions in the first and second storages, optimum adaptation cannot be achieved. In this case there is no optimum adaptation of the control process of the servo-adjusting device to the regulation of the opening angle of the butterfly valve. As a result, fuel consumption would rise.

OBJECT OF THE INVENTION

The object of the present invention is to eliminate the above described disadvantages and to provide an automatic control system for an infinitely variable transmission gear with several driving range stages, driven by an internal combustion engine where, at each performance level of the internal combustion engine selected by the driver of the vehicle, the transmission ratio to the internal combustion engine is automatically regulated so that optimum operating conditions are achieved at minimum fuel consumption.

SUMMARY OF THE INVENTION

This object and others which will become apparent hereinafter are attained, in accordance with the present invention, in an automatic control device for the purposes described which is provided with a data or information storage unit, hereinafter referred to as an engine characteristic storage, in which an optimum fuel consumption curve which is a function of the driving engine, is stored, this storage being provided in one of the two signal transmission lines (either the throttle valve control line or the adjustment regulating line). A standstill cutoff valve is switched by a selector device so that in the standstill position, all of the speed selecting clutches are vented or ineffective. Finally, in connection with the broadest aspect of the invention, a driving engine speed signal and a transmission output speed signal are compared by a speed comparator and, at reaching the desired speed level, a changeover valve is operated to switch the clutches.

According to a feature of this invention, a range switch valve is provided to effect a reversal of the direction of adjustment of the servomotor in accordance with the driving range. This range switch valve can be a three-position valve which, in its central position, blocks both lines connected with the servomotor.

According to another feature of the invention, a drive controller is provided which, during a change in the drive range, is controlled by the speed comparator so that a differential speed signal effects a function reversal of the regulating valve.

In still another feature of the invention, a bypass valve is provided between the two working pressure lines of the hydrostatic unit forming the steplessly adjustable transmission so that, during standstill, there is at most only a slight throttling effect and with increasing driving engine speed, the throttling effect approaches zero.

Furthermore, the speed comparator, for control of the starting process, can compare the driving engine speed signal and the output speed signal of the output unit of the hydrostatic transmission to form a referent signal that acts upon the servo-adjusting device.

According to yet another feature of this invention, the changeover valve is a four-port, three-position valve so that, on upstepping, the central position comes into operation for a limited time depending upon the clutch actuating pressure so that pressure is applied to one clutch during return travel of the previously operated clutch. A synchronization signal in the form of an analogue signal is generated by the comparator and the changeover valve is switched against the force of a spring while, during the switching process, pressure of the pump medium is applied to the side of the changeover valve opposite the spring.

The selector device is also provided with a speed reduction signal which can be set to override the accelerator travel signal or the controller signal accordingly.

The system of the invention offers particular advantages in that the transmission starting moment, or the torque of the driving engine, is always adjusted to the same level for a constant accelerator pedal position, and that the gear transmission adapts to the changing vehicle resistances. There are therefore no power losses e.g. due to engine compression such as are known from many other control and regulating devices. The total power of the driving engine can therefore be fully exploited within the maximum possible traction range during any state of operation and under any load situation. This facility of adaptation to the optimum engine characteristic of the driving engine offers the added advantage of each performance level of the driving engine being assigned the appropriate speed at which it operates with minimum fuel consumption.

One advantageous embodiment of the invention features a speed restriction for machines, in particular for farm tractors. It is so designed that any desired speed restriction can be preselected. For road vehicles it is also of advantage to be able to preselect and permanently adjust the required speed limit for roads subjected to speed restrictions.

Another advantage is the excellent switching quality of the infinitely variable gear unit, achieved through the incorporation of a change-over valve and a range switch valve by means of which further adjustment of the servomotor is cut off.

BRIEF DESCRIPTION OF THE DRAWING

Below the system the invention for the automatic control of an infinitely variable transmission gear driven by an internal combustion engine is explained for two embodiments with reference to drawing in which.

SPECIFIC DESCRIPTION

Figure 1:
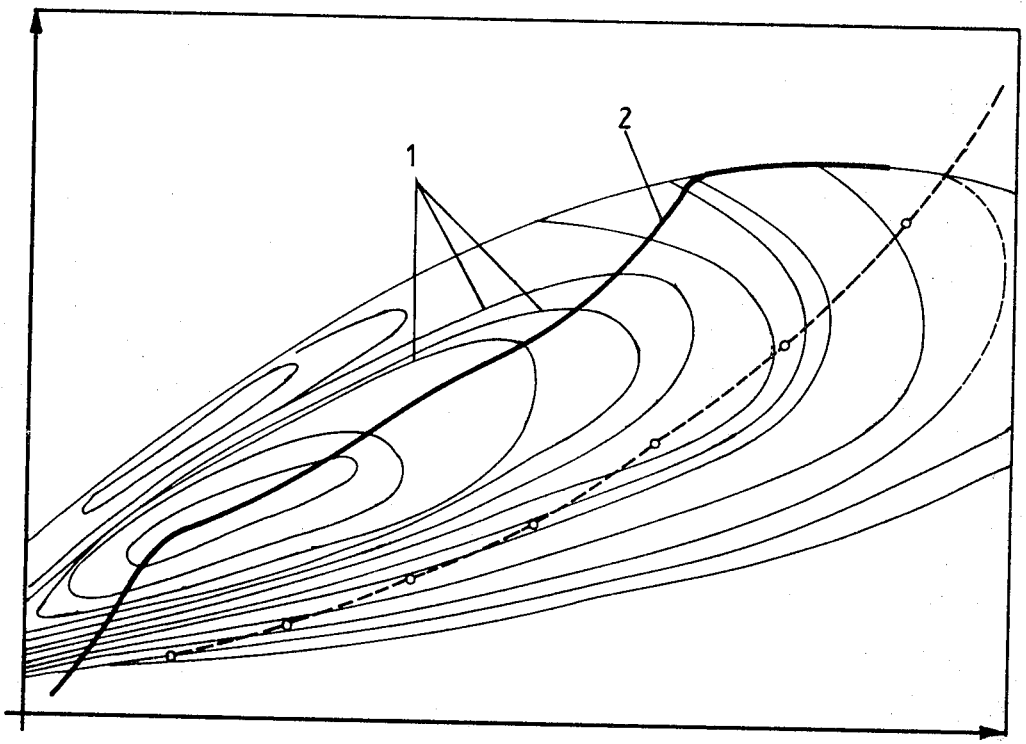
FIG. 1 is a graph which shows a family of curves for an internal combustion engine with an optimum consumption curve for one relevant, infinitely variable gear unit.

In the diagram of FIG. 1 the curves 1 of constant fuel consumption are given for one internal combustion engine. The ordinate shows the performance in relation to the rotational speeds of the internal combustion engine given on the abscissa. This diagram of FIG. 1 shows an optimum consumption curve 2 for an internal combustion engine with infinitely variable gears, i.e. a curve for minimum fuel consumption at optimum rotational speed and maximum power. It is in accordance with this optimum consumption curve 2 that the automatic control device of the invention is to operate.

Figure 2:
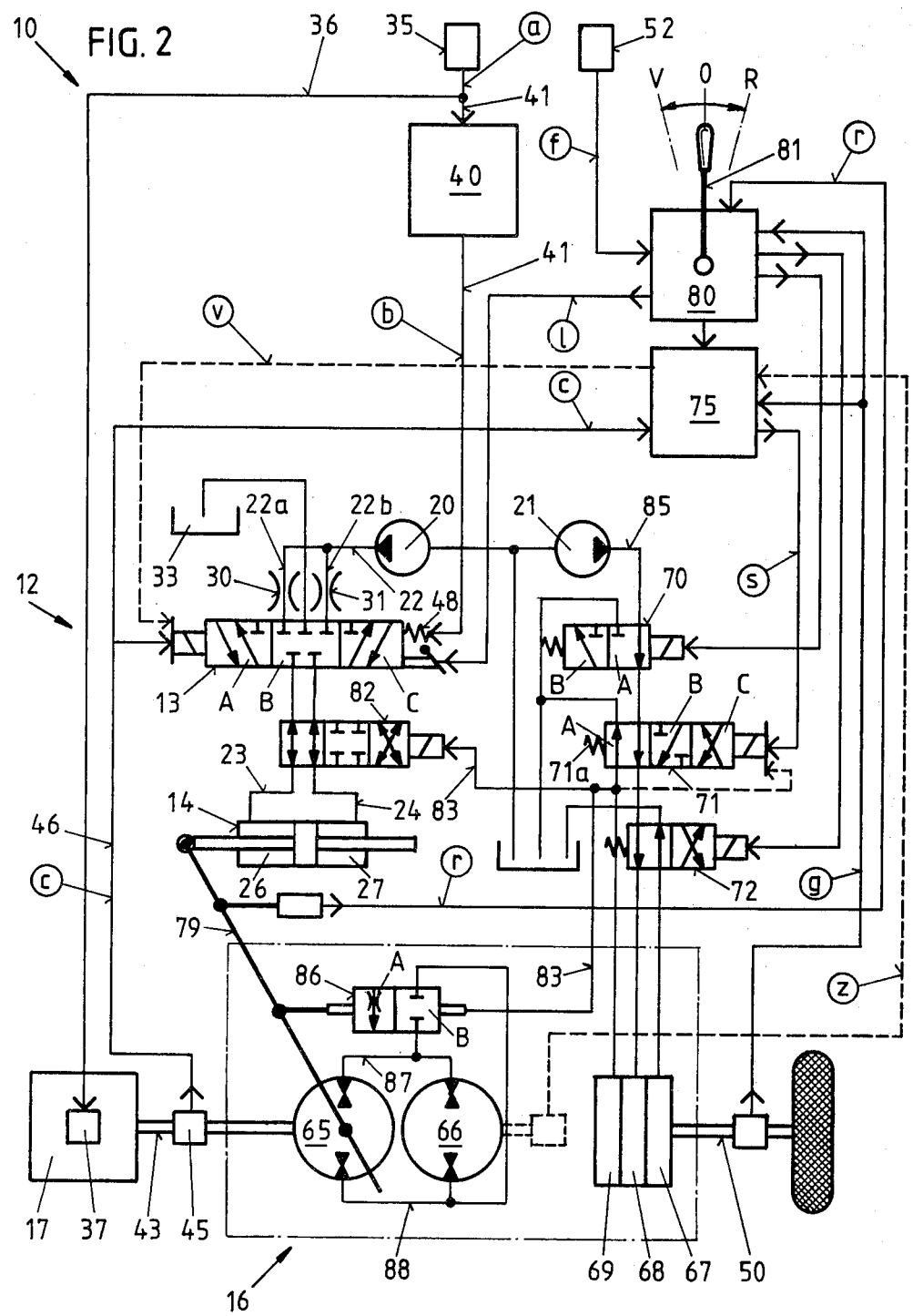
FIG. 2 is a hydraulic flow diagram of an automatic control system of an infinitely variable gear unit with three driving ranges.

FIG. 2 shows an automatic control device 10, a servo-adjusting device 12, a regulating valve 13 acting as a pressure balance, a servo-motor 14, an infinitely variable gear unit 16 and a driving engine 17. The servo-adjusting device 12 comprises a regulating valve 13, a servo-pump 20 which transports pump medium through the pump lines 22 to the regulating valve 13 and on through two adjustment lines 23 and 24 to the two working spaces 26 and 27 of the servomotor 14. The regulating valve 13 is designed as a 5/3 5-port, 3-position valve, so that in position A, adjustment line 23 is connected with the servo-pump 20 via the pump line 22, and in position C, adjustment line 24 is connected with the servo-pump 20 via the pump line 22. In the central, neutral position B all connections of the regulating valve 13 are blocked. In order to provide for the various adjustment speeds required by different vehicles for the ratio changes of the infinitely variable gear unit 16, in both directions, the pump line 22 can be designed as a twin line 22a and 22b with a separate throttle (or diaphragm) 30 and 31 for each adjustment direction in the pump lines 22a and 22b, respectively. Direct regulating of the infinitely variable gear unit 16 is effected by the servomotor 14: one of the two working spaces 26 and 27, depending on the setting of the regulating valve 13, is filled with pump medium by the servo-pump 20 via the corresponding control line 23 or 24, while the other working space is connected with a tank 33.

In relation to the position of the accelerator pedal 35, an accelerator travel signal a is produced which is transmitted through a throttle valve control line 36 to a throttle valve governor 37 for controlling the driving engine speed. The accelerator travel signal a is also transmitted, via an adjustment regulating line 41, to an engine characteristics storage 40 where the optimum consumption curve 1 according to FIG. 1 is stored. The engine characteristics storage 40 transmits a control signal b, i.e. the accelerator travel signal a modulated in accordance with the family of curves shown in FIG. 1, through the adjustment regulating line 41 to operate the regulating valve 13.

The control signal b, acting on the regulating valve 13 and produced in the engine characteristics storage 40, ensures that the driving engine 17 will, during each driving situation, operate at a speed which produces the required power at minimum fuel consumption. The engine characteristics storage 40 is provided for this purpose, for it stores the characteristics of the most favorable fuel consumption figures for the driving engine 17 employed, i.e. the optimum consumption curve 1 of FIG. 1. Another control value is the driving engine speed signal c which is produced by a tachometer 45 connected with a transmission input shaft 43 and which is transmitted through a regulating line 46 to the regulating valve 13 in such a way that it counteracts the control signal b.

FUNCTION OF THE CONTROL DEVICE WITHOUT DRIVING RANGE CHANGE

The regulating valve 13 compares the driving engine speed signal c with the control signal b and, during starting, with preselected driving direction, the force of a valve spring 48 additionally acting on the regulating valve 13 predominates so that the regulating valve 13 is initially kept in its switch position C. The gear transmission is therefore retained in zero position until the idling speed has been exceeded and an increasing driving engine speed signal c exceeds the counterforce of the valve spring 48.

If the driving engine speed signal c is stronger than the control signal b, the regulating valve 13 is switched to position A and the servomotor 14 is swung out to effect a gear ratio change of the infinitely variable gear unit 16 toward higher output speeds. If the control signal b receives a higher value than the driving engine speed signal c, the regulating valve 13 switches to switch position to effect a gear ratio change of the infinitely variable gear unit 16 toward lower driving speeds and the vehicle slows down. When both signals have the same value, function B of the regulating valve 13 comes into effect and no gear ratio change takes place.

The position of the regulating valve 13, and with it the gear transmission, are automatically varied until the driving engine speed signal c and the control signal b are in equilibrium. Consequently, each position of the accelerator pedal 35 is assigned a certain driving engine speed for the appropriate load. Once the accelerator pedal 35 has been adjusted, the ratio of the gear unit 16 will automatically adjust to a certain value. If, for example, there is an increasing ascent, the driving engine speed is initially decreased in order to increase the traction. As a result, the driving engine speed signal a is reduced and, while the accelerator pedal position and thus the accelerator travel signal a, or the control signal b, remain unchanged, the regulating valve 13 moves to position C whereupon a gear ratio change of the infinitely variable gear unit 16 toward lower output speeds is effected via the servomotor 14 until the driving engine speed signal c regains its original value and an equilibrium with the control signal b is reestablished.

Conversely, an increasing descent leads to a higher driving engine speed signal c and, due to the lower vehicle resistance, a higher gear transmission ratio is effected by the regulating valve 13 until the driving engine speed signal c regains its original value. With the accelerator pedal remaining in the same position, the torque of the driving engine 17 is therefore adjusted to a constant value and the ratio of the infinitely variable gear unit 16 is adapted to changing vehicle resistances. Loss of power due to engine compression is thus avoided.

During acceleration, the increasing control signal b, which is determined by the engine characteristics store 40 in accordance with the position of the accelerator pedal 35, occurs immediately at the regulating valve 13 causing this to tip straight away into the switch position C thus effecting a reset of the gear ratio. This means that the driving torque is immediately reduced so that the driving engine 17 rapidly reaches a high speed and thus a high performance. The driving engine speed signal c quickly assumes a value that initially is even higher than the already raised control signal b so that the regulating valve 13 moves to position A and changes the gear ratio in the opposite direction until the load conditions, via the driven shaft 50, and the gear ratio have given the driving torque a value at which the driving engine speed signal c and the control signal b are in equilibrium. During the acceleration phase, therefore, the ratio in the gear unit is initially set back and, as soon as the driving engine 17 has reached the required performance, the ratio is changed in the opposite direction until the desired driving situation corresponding with the accelerator pedal position has been achieved.

Figure 3:
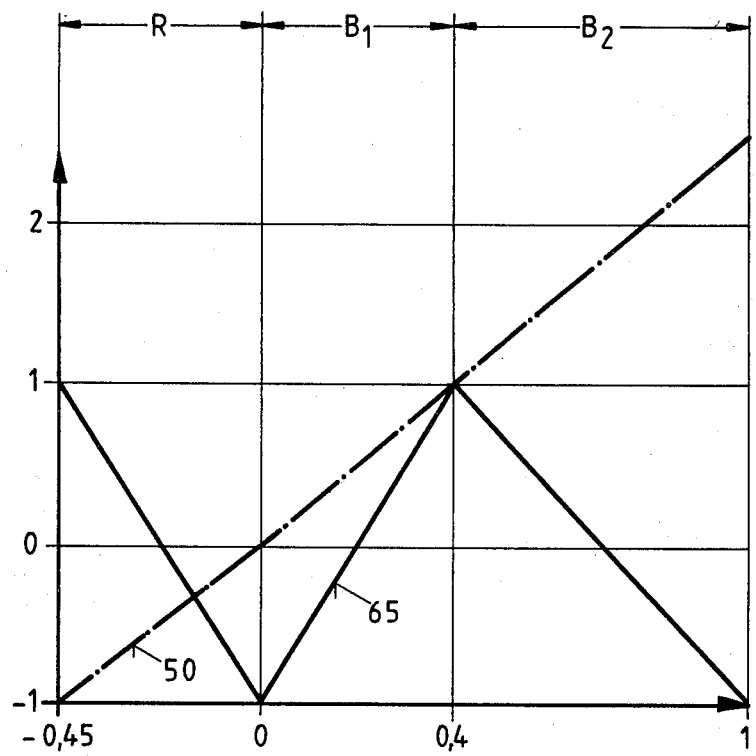
FIG. 3 is a rotational speed chart.

FIG. 2 shows, as one embodiment of the invention for an infinitely variable gear unit with several driving and switching ranges (one reversing range R and two forward speed ranges $B_1$ and $B_2$), a hydrostatic-mechanical gear transmission with load distribution. A first hydrostatic unit of variable volume is designated 65 and a second hydrostatic unit with constant volume 66. A possible rotational speed chart of the gear unit 16 with load distribution can be seen in FIG. 3. It shows how, within each driving range, the variable hydrostatic unit setting moves between the two extremes of maximum negative and maximum positive displacement. This means that a change-over of the hydrostat adjustment is required within each driving range in order to reverse the adjustment direction. At the same time, a change in the driving range effected by changing the clutches leads to a change in the power transmission. Thus the output to the driven shaft 50 in the reversing range is effected via clutch 67, in the first forward speed range via clutch 68 and in the second forward speed range via clutch 69. At the switch point from the first to the second driving range the first hydrostatic unit 65 is therefore swung out to maximum position displacement where the two clutches 67 and 68 are running synchronously, whereupon switching into the other switching range is started automatically. In the second driving range the hydrostatic unit 65 is now set back from the switch point down to zero delivery position and further into the negative range to the final position where the final transmission is reached.

A standstill cut-off valve 70 and two change-over valves 71 and 72 switched in series are provided for the operation of the clutches. Via the standstill cut-off valve 70, pump medium is provided for operating the clutches 67, 68 and 69, when, via the change-over valve 71 in position C, pressure is applied to clutch 69 for the second forward speed range and, in the starting position A, pressure medium is transferred to the change-over valve 72 which operates to ensure the application of pressure either to clutch 68 for the first forward speed range or to clutch 67 for the reversing range.

Change-over valve 72 is controlled via a selector device 80 which serves for the preselection of the driving direction, forward or reverse, by means of a selector lever 81.

Change-over valve 71 is controlled by a speed comparator 75 which compares the driving engine speed signal c with the output speed signal g, or an output signal z of an output shaft of the second hydrostatic unit 66, and, once the appropriate ratio of speeds for a synchronous running of clutches 68 and 69 has been established, transmits a synchronization signal s for operating the change-over valve 71.

Change-over valve 71 should preferably be designed as a 4/3 four-part, three-position valve with an intermediate position B at which, during change-over into the second forward speed range, clutch 69 is already being supplied with pressure medium, whilst the first range clutch 68 is still closed. When changing back from the second to the first forward speed range, non-occurrence of the synchronization signal s means an immediate return to position A. Reversal of the adjustment direction of the hydrostatic unit 65 during a driving range change is effected by a range switch valve 82 which, via a control line 83, is connected with clutch 69 for the second forward speed range. When there is no pressure applied to clutch 69, the range switch valve 82 assumes its starting position at which the servomotor 14 is, at increased output speeds, adjusted toward positive displacement both in the first forward speed range and in the reversing range.

So as to facilitate optimum switching, the range switch valve 82 is designed as a 4/3 valve with a locking function between the two change-over positions. This prevents further adjustment of the servo-adjusting device during the change-over process.

The standstill cut-off valve 70 is also controlled by the selector device 80. When the selector lever 81 is moved to the idling position, the standstill cut-off valve 70 moves to switch position B at which the supply line 85 from the servo-pump 21 to the clutches is blocked and the clutches themselves are aerated. If the selector lever 81 is moved to switch positions for forward speed or reversing, the standstill cut-off valve 70 is switched to position A with the result that the pressure medium is delivered to the subsequent change-over valves 71 and 72.

A speed restriction facility is provided in addition. Speed restriction can be effected either by means of a feedback signal r from a final control element 79 of the hydrostatic unit 65, or via the output speed signal g. Starting from the selector device 80, a speed restriction signal l is transmitted to the regulating valve 13 so that, if the speed limit is exceeded, regulating valve 13 is moved to switch position C which leads to a gear unit output speed transmission toward lower rotational speeds.

Also provided is a brake pedal or inching pedal 52 by means of which the gear transmission is infinitely variable down to vehicle standstill. This involves an inching pedal travel signal f that overrides the speed restriction signal 1 produced by the selector device 80. There is therefore an operative connection between the selector lever 81 and the inching pedal 52. Every position of the brake pedal or inching pedal 52 thus corresponds with a certain gear transmission ratio.

In order to ensure smooth, jerk-free starting under any load condition, a by-pass valve 86 is provided between the two working pressure lines 87 and 88 of the two hydrostatic units 65 and 66. With the driving direction having been preselected via the selector lever 81, the accurate speed ratio between the two hydrostatic units 65 and 66 required for standstill is ensured for the starting process by short circuiting the two working pressure lines 87 and 88. The by-pass valve 86 is so designed that, during vehicle standstill, function A is in operation and the throttling effect is low. With beginning adjustment of the hydrostatic unit 65, the throttling effect starts to increase up to the transition point to the locking function B. The control route of the by-pass valve 86 is so adjusted that, with maximum starting torque, or maximum starting traction, and although there is a correspondingly higher waste oil content in the two hydrostatic units 65 and 66—both units are set to maximum delivery volume at this state—the speed ratio between the two hydrostatic units required for standstill is ensured until the starting traction required in each case has been reached. In order to prevent the by-pass valve from reacting while the final transmission ratio operates—the same hydrostat adjustment as for the starting point would make a response by the by-pass valve possible—a control signal 83, which operates for the second forward speed range with clutch 69 being closed, maintains the by-pass locking function B.

As an alternative to the by-pass valve 86, it is possible to control the starting process by means of a comparison of rotational speeds between the driving engine speed signal c and the speed signal z of the constant hydrostatic unit 66. For this purpose the speed signals c and z are compared in the speed comparator 75 to form a reference signal v which is transmitted to the regulating valve 13 for the control of the servo-adjusting device 12.

Figure 4:
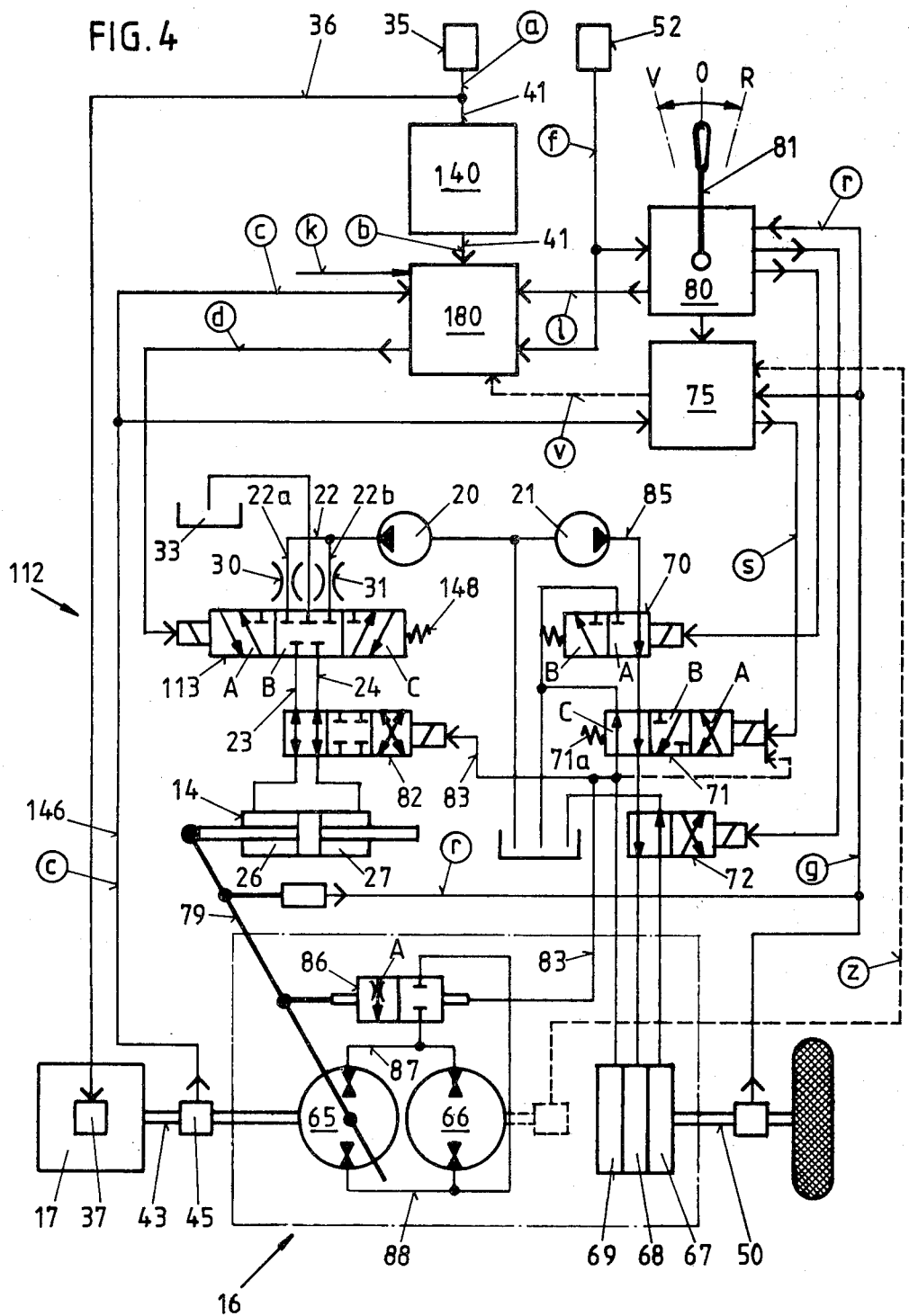
FIG. 4 is a view similar to FIG. 2 which shows an embodiment featuring an electronic drive controller.

FIG. 4 shows an automatic control device that differs from the configuration of FIG. 2 by a preferably electronic drive controller 180. The regulating valve 113 is controlled by a derivative control signal d acting against the force of a valve spring 148. The control signal b and the driving engine speed signal c are compared in the drive controller 180 and the difference is added to a constant control factor k. If the derivative control signal d equals the constant control factor k, function B of the regulating valve 113 comes into force and no transmission change takes place. If, on the other hand, the derivative control signal d is higher, resulting from the positive difference between the signal values of the driving engine speed signal c and the control signal b, function A of the regulating valve 113 comes into effect and the gear transmission ratio is changed toward a higher output speed. If the derivative control signal d is lower than the constant control factor k, i.e. if there is a negative difference between the signal values of the control signal b and the driving engine speed signal c, the regulating valve 113 is switched to function C which leads to a transmission ratio change toward lower output speeds.

A maximum speed limitation in this embodiment of the invention is controlled by the electronic drive controller 180. A speed restriction signal 1 is transmitted by the selector device 80 to the electronic drive controller 180 to produce a differential speed signal d which controls the regulating valve 113 in the familiar manner described.

The braking signal f is, in this embodiment, transmitted by the brake pedal or inching pedal 52 directly to the electronic drive controller 180 which affects it, in a similar way as the speed restriction signal 1, in such a way that its value falls below the set point limit of the maximum speed until the appropriate reset of the transmission ratio required for braking the vehicle has been effected.

As a modification of the configurations shown in FIG. 2 and FIG. 4, it is also possible for the accelerator travel signal a to be transmitted directly to the regulating valve 13 or the electronic drive controller 180, and for the engine characteristics store 40 to be fitted in the throttle valve control line 36.

The engine characteristics store 40 may also be incorporated as an integral component inside the electronic drive controller 180.

According to another embodiment of the invention it is further possible to omit the range switch valve 82. Instead, the drive controller 180 is so controlled via the speed comparator 75 that the formation of a difference between the driving engine speed signal s and the control signal b effects a sign reversal, so that the differential speed signal d controls the regulating valve 113 in such a way as if the switch positions A and B were interchanged.

We claim:

1. In a motor vehicle transmission system for a vehicle having driven wheels, said system comprising:
   an internal combustion engine having a throttle valve;
   a steplessly variable hydrostatic transmission provided with a first unit connected to said engine and adapted to be driven thereby, and a second unit connected to said first unit by a pair of pressure lines;
   a speed selection gear transmission connected to said second unit and having a plurality of clutches selectively operable to set output speed ranges, said gear transmission having an output shaft connectible to the wheels of the vehicle;
   an accelerator pedal adapted to generate an accelerator travel signal and connected to said throttle valve for adjusting the opening thereof; and
   a servomechanism including a servovalve responsive to said signal, and a servomotor connected to said servovalve and operatively linked with said hydrostatic transmission for controlling the ratio thereof, the improvement wherein:
   said signal is applied to said throttle valve by a first control line and to said servovalve by a second control line;
   an engine characteristic storage means interposed in one of said control lines and storing an optimum fuel consumption curve characteristic of said engine for modifying said accelerator travel signal in accordance with said optimum consumption curve;

a standstill cutoff valve provided with a selector device for inactivating all of said clutches in a standstill position of said vehicle;

means for deriving a driving engine speed signal (c) from said engine and an output speed signal (g/z) from a location between said second unit and said wheel; and a speed comparator for comparing said signals (c) and (g/z) to operate a changeover valve and switch-over actuation from one of said clutches to another of said clutches.

2. The improvement defined in claim 1, further comprising a range switch valve responsive to the pattern of clutch actuation for effecting a reversal in the adjustment direction of said servomotor by said servovalve.

3. The improvement defined in claim 2 wherein said range switch valve is a four-port, three-position valve having a central position blocking a line connecting said servovalve with said servomotor.

4. The improvement defined in claim 1 wherein said selector device is connected to a drive controller and with said comparator to produce a differential signal (d) effecting a functional reversal of said servovalve.

5. The improvement defined in claim 1, further comprising a bypass valve connected between said pressure lines so that during standstill there is at most a slight throttling effect between said pressure lines and, with increasing engine speed, the throttling effect is reduced to zero.

6. The improvement defined in claim 1 or claim 14 wherein said comparator produces a reference signal (v) acting upon said servovalve.

7. The improvement defined in claim 1 wherein said changeover valve is a four-port, three-position valve having a central position effective for a limited time, depending upon clutch pressure, such that pressure continues to be applied to one clutch while another clutch is restored to its inactive position.

8. The improvement defined in claim 1 wherein said comparator transmits; a synchronization signal (s) in analogue form to said changeover valve against the force of a spring, medium from a hydraulic pump being supplied to the side of said changeover valve opposite said spring.

9. The improvement defined in claim 1, further comprising means at said selector device for generating a speed restricting signal and for applying said speed restricting signal to said servovalve.

* * * * *